Figure 5:
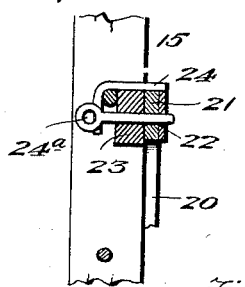

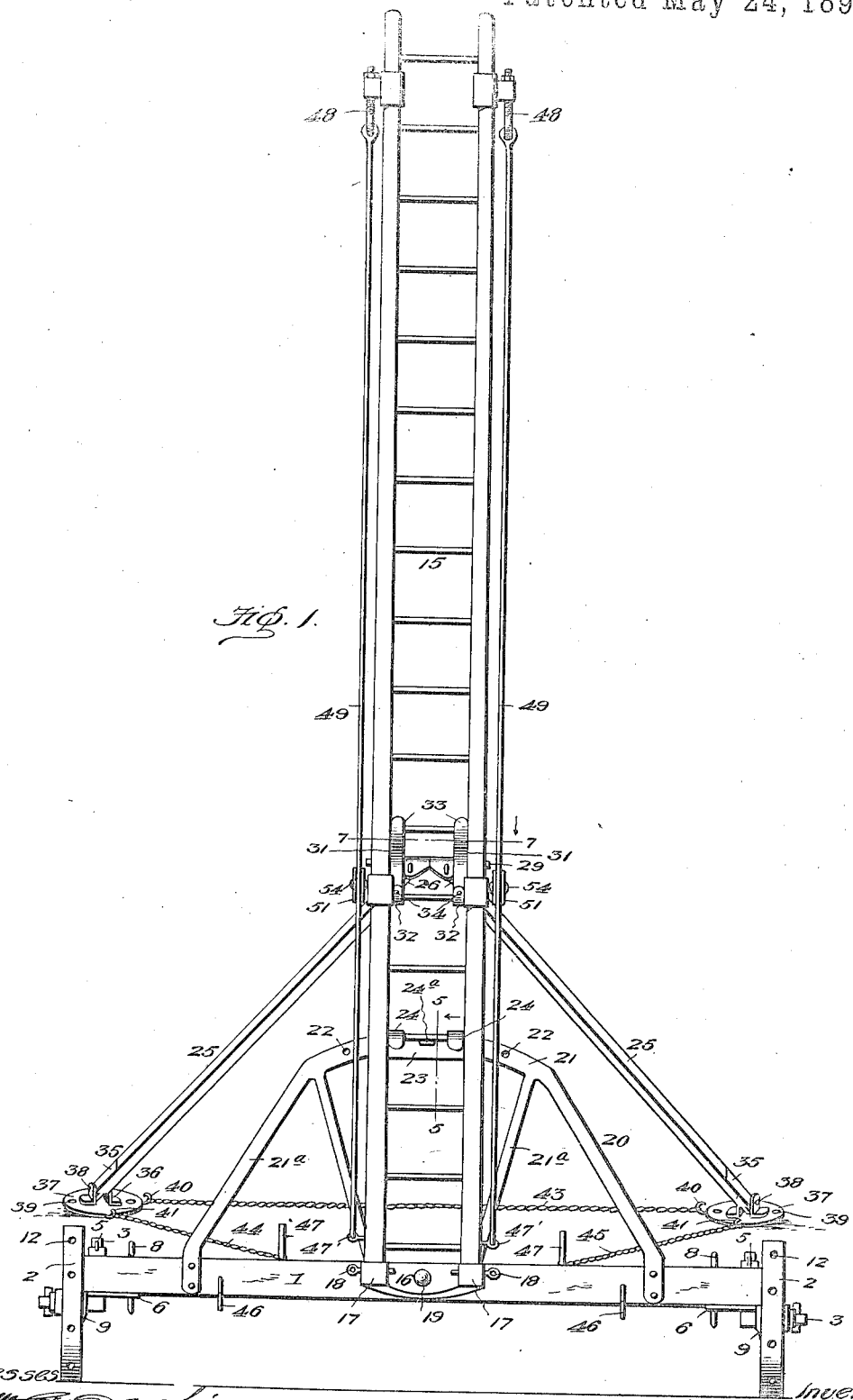

(No Model.) 3 Sheets—Sheet 2.
H. HUBER.
PORTABLE ADJUSTABLE LADDER.
No. 604,531. Patented May 24, 1898.
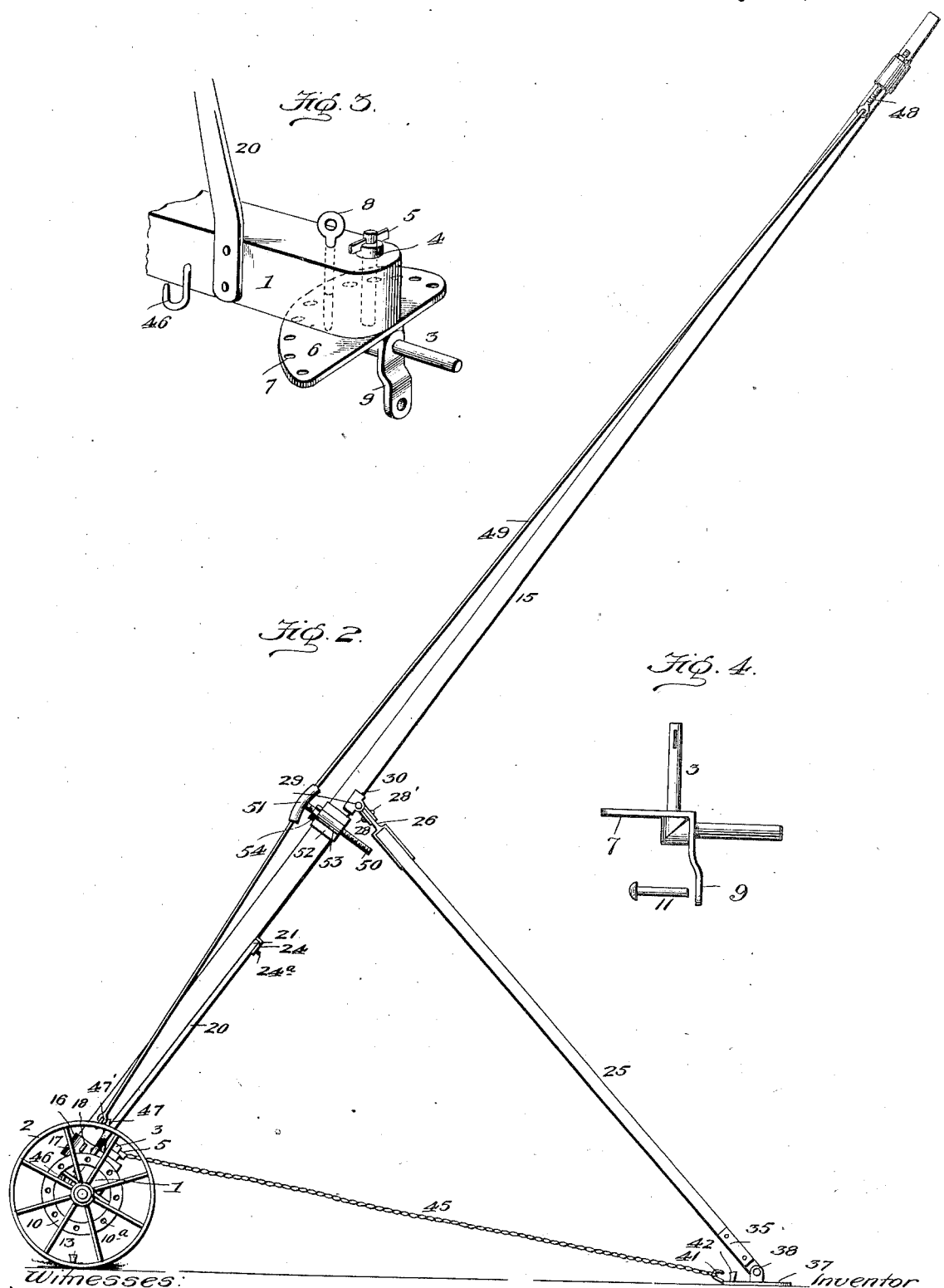

(No Model.)

H. HUBER.
PORTABLE ADJUSTABLE LADDER.

No. 604,531.

Patented May 24, 1898.

3 Sheets—Sheet 3.

Witnesses:

Henry Huber — Inventor

By Edson Bros. — Attys.

UNITED STATES PATENT OFFICE.

HENRY HUBER, OF MANSFIELD, OHIO.

PORTABLE ADJUSTABLE LADDER.

SPECIFICATION forming part of Letters Patent No. 604,531, dated May 24, 1898.

Application filed August 11, 1897. Serial No. 647,858. (No model.)

*To all whom it may concern:*

Be it known that I, HENRY HUBER, a citizen of the United States, residing at Mansfield, in the county of Richland and State of Ohio, have invented certain new and useful Improvements in Portable Adjustable Ladders; and I do hereby declare the following to be a full, clear, and exact description of the invention, such as will enable others skilled in the art to which it appertains to make and use the same.

My invention relates to improvements in portable adjustable ladders designed especially for service in gathering fruit from trees, although capable of use advantageously in other relations where it is desirable to employ such a structure.

The primary object of my present improvement is to provide a simple structure which may be used either on level ground or a hillside with perfect safety to the operator and enable him to advantageously gather fruit from a tree without injury to the tender branches of the tree and to secure the fruit in the best possible condition for packing, so as to enable the fruit to be packed and shipped without injury thereto.

A further object of the invention is to provide novel mechanism whereby the ladder proper may be tilted or canted at an angle to the main carrying-axle and be securely and steadily locked either in its upright or tilted position, whereby the ladder may be employed with equal advantage on level or sloping ground.

A further object of the invention is to support the carrying-wheels for the main axle in a novel manner to enable said wheels to be adjusted at any angle desired with relation to the carrying-axle or to be used in an inverted position with relation to said carrying-axle, and to be held rigidly in place in either of its adjusted positions against any tendency to slip.

A further object of the invention is to provide novel construction of the braces by which the ladder is held securely and steadily in place in a vertically-inclined position laterally with respect to the carrying-axle, which bracing devices operate to good advantage in the canted or tilted position of the ladder when used on sloping ground, and which may also be adjustably connected to the ladder at different distances from its pivotal point without having to dismantle the operative parts of the structure for the purpose of adjusting the braces.

A further object of the invention is to provide an improved means for trussing and strengthening the ladder which shall be simple and easily adjustable, which trussing devices are especially advantageous in heavy and long ladders.

With these and other ends in view which will hereinafter appear, the invention consists in the novel combination of elements and in the construction and arrangement of parts, all as will be hereinafter fully described and claimed.

To enable others to understand my invention, I have illustrated the preferred embodiments thereof in the accompanying drawings, forming a part of this specification, and in which—

Figure 6:
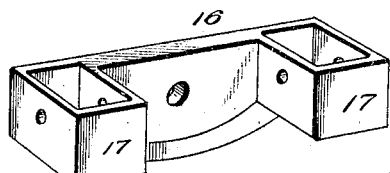
Figure 8:
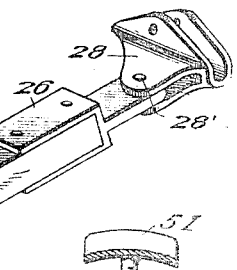
Figure 7:
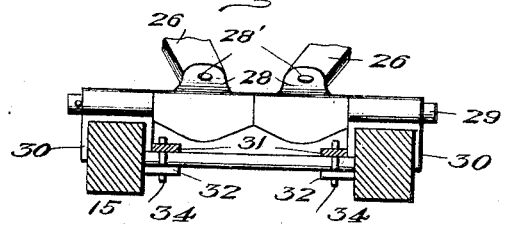
Figure 9:
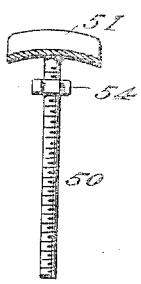
Figure 10:
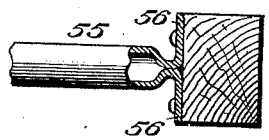
Figure 11:
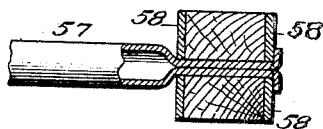
Figure 12:
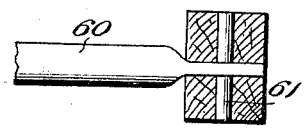

Figure 1 is a front elevation of a portable adjustable ladder constructed in accordance with my invention. Fig. 2 is a side elevation thereof. Fig. 3 is an enlarged detail perspective view showing a part of the carrying-axle with the adjustable carrier for the wheel. Fig. 4 is a detail view of the crank-shaped stub-axle for the carrying-wheel shown by Fig. 3. Fig. 5 is a detail sectional elevation on the plane indicated by the dotted line 5 5 of Fig. 1, illustrating the means for locking the pivoted ladder in its adjusted positions on the supporting-frame. Fig. 6 is a perspective view of the pivoted carrier for the lower extremity of the ladder. Fig. 7 is a transverse horizontal section on the plane indicated by the dotted line 7 7 of Fig. 1, illustrating the means for attaching the braces to the ladder. Fig. 8 is a detail perspective view of the swiveled connections between the upper ends of the ladder-braces and the rod or bolt by which the braces are attached to the clamps that engage with the ladder. Fig. 9 is an enlarged detail view of the adjustable tension-bolt and the saddle therefor for the truss-cables. Figs. 10 to 12 are views illustrating different means for joining the rungs to the sides of a ladder.

Like numerals of reference denote corresponding parts in all the figures of the drawings.

1 designates the main carrying-axle of my portable adjustable ladder. This consists of a stout beam, preferably of wood, and it is sustained at the proper height from the ground by the carrying-wheels 2 2, each of which is connected by L-shaped axles with the main beam in a manner to permit of the ready adjustment of the axles and the carrying-wheels to maintain the beam or main carrying-axle in a level or inclined position. Each L-shaped axle 3 has one arm thereof fitted to turn freely in a transverse opening 4, provided near one end of the main carrying-axle 1, and the other arm of said L-shaped axle projects out from the main carrying-axle for a sufficient distance to form a spindle on which the wheel 2 is fitted, so as to turn freely thereon. The upright arm of the wheeled axle 3 is thus pivotally supported in the end of the main carrying-axle in a manner to turn or be adjusted in an arm of a circle, and thus the axle 3 is adapted to be turned, so as to support the wheel at the end, or at either side, or at any desired angle with relation to the main carrying-axle 1. The upright stem of the wheeled axle has a transverse opening, in which is fitted a key or cotter-pin 5, and the axle is thus detachably connected to the main carrying-axle to permit of the ready removal of the axle 3 and its inversion with the wheel in a manner to support the main carrying-axle in low down relation close to the ground. Rigid with this cranked wheel-carrying axle is a segment 6, which projects at right angles from the upright arm of the axle, so as to lie normally below the main carrying-axle 1, and said segment is provided with a series of apertures 7, in any one of which may be fitted a removable locking-pin 8, which passes through a vertical aperture in the carrying-axle 1, thus serving as a means for locking the cranked axle in the position to which it and the wheel mounted thereon may be adjusted. The cranked axle is also provided with a rigid pendent arm or hanger 9, which is disposed adjacent to the plane of the spokes of the wheel 2, and on these wheel-spokes is provided a ring or annulus 10, having a series of apertures 10ª, through any one of which may be passed a locking-pin 11, that is adapted to enter an opening in the arm or hanger 9, to thus lock the carrying-wheel in fixed relation to the cranked axle and prevent the wheel from turning. As a further means for holding the wheel 2 from rotating on its spindle and to maintain the machine in proper position after it has been adjusted, I have provided the rim of the wheel, at intervals between its spokes, with the apertures 12, through which may be driven a stake or rod 13, so as to stake the wheel to the ground.

The ladder is represented at 15 in the drawings as being a trussed structure. While this form of the ladder is very desirable where it is necessary to use long ladders for reaching to considerable heights, I do not strictly limit myself to the employment of the trussed ladder, as I am aware that lighter ladders may be employed when the machine is not designed to be built for reaching up to the tops of tall trees or for other work. The ladder 15 is mounted on the main carrying-axle by a carrier 16. This carrier is in the form of a casting provided with sockets 17 to receive the lower extremities of the rails or sides of the ladder, and the rails are fastened or held in the carrier by transverse bolts or pins 18. The ladder-carrier is pivoted to the main carrying-axle by a stout bolt 19, which passes through said carrier and the axle at the middle thereof, and thus the carrier is attached to the axle in a manner to tilt or cant the ladder laterally or sidewise and maintain it either at right angles to the axis of the axle 1 or in a slightly-canted position with relation thereto.

The ladder is sustained in its upright position by a supporting-frame 20 and by a pair of braces 25. Of these elements the supporting-frame 20 is carried by the main axle 1, and the ladder rests against the same at a point intermediate between the axle 1 and the braces 25. The supporting-frame has a segment 21, perforated at 22, and this segment is joined to the axle 1 by the bars 21ª, which are suitably joined to the segment and bolted to the axle 1. Between the rails of the ladder is arranged a block 23, which carries the clips 24, suitably attached to the block and arranged to embrace the segment 21 of the holding-frame and one of the rounds of the ladder. The clips 24 are adapted to slide over the segment 21, and they are suitably fitted to the ladder-round. Through the block 23 and a web or plate which connects the clips passes a pin 24ª, which is adapted to enter either of the apertures 22 in the segment 21, and thus hold the ladder in its canted or tilted position.

The braces 25 are two in number, and said braces are attached removably to the ladder by universal-joint devices. The upper ends of the braces are provided with the straps 26, which are suitably fastened to said braces and the straps 28. Said sleeves are pivotally attached to the sleeves by suitable trunnions or pintles 28'. The sleeves are fitted loosely to turn on a stout hinge bolt or rod 29, and this hinge bolt or rod is supported at its ends in the clip-shaped bearings 30 30, which are arranged to embrace the ladder-rails on their rear faces. These clip-shaped bearings for the brace's hinge-bolt are provided with the elongated plates 31 31, which are arranged to lie between and close up to the rails of the ladder, and each elongated plate 31 is doubled upon itself at its lower extremity to form the keeper 32, while the upper end of the plate is inclined laterally to form the finger 33. The plates are adjusted to have their keepers fit around one of the rounds of the ladder, and they are held from vertical displacement by means of the removable locking-pins 34, which are passed through suitable openings provided in the keepers, so as to bear or rest upon the ladder-round which is embraced by said keepers. The inclined fingers of the elongated plates are designed to rest against the front sides of the ladder-round above the round engaged by the keepers. This construction of the device for attaching the braces to the ladder provides a secure means for connecting the braces to the ladder in a manner to permit of the ready adjustment by hand of said attaching device to enable the braces to sustain the ladder at the desired inclination to the ground, and the sleeves of the attaching device, with the pivotal connection between the braces and the sleeves, enable the braces to be spread laterally with respect to each other or to be turned to vertical inclinations according to the angle of the ladder with respect to the main axle 1. When the attaching device is in service, the sleeves are arranged between the clip-like bearings of said attaching device, so as to abut against each other and against the adjacent ends of the bearings, whereby the bearings serve to confine the sleeves against sliding movement on the hinge-rod and yet permit the sleeves to turn freely on the hinge-rod and without interfering with the pivotal movement of the braces on the pintles or trunnions which connect the sleeves to the braces.

The braces have their outer lower ends provided with the clips 35, to which are loosely connected the eyebolts 38 of the ground-plates 37, thus connecting the ground-plates by loose joints to the lower ends of the braces. These ground-plates may be of the disk-like form shown in the drawings to give a broad bearing on the ground, and each plate has a series of openings 39 and two hooks 40 41. Vertical rods or stakes 42 may be passed through the apertures 39 of the ground-plates to hold them firmly in place on the ground and prevent the braces from spreading when the ladder is in service. This spreading of the braces is also prevented by the employment of the anchor-chains 43 44 45. One anchor-chain, 43, is attached to the hooks 40 40 on the ground-plates to prevent them from moving away from each other, while the other anchor-chains, 44 45, are attached, respectively, to the hooks 41 of the ground-plates and thence led toward the main axle 1, beneath and around which the chains are carried so as to engage with the hooks 46 or with the inclined pins 47, said hooks and pins being fastened to the main axle on opposite sides of the pivotal connection of the ladder-carrier therewith.

The ladder has its rails provided near its top and bottom ends with the short eyebolts 47' 48, which project from the sides or faces of the rails, and to these eyebolts are attached the ends of the truss-cables 49 in any suitable way. These truss-cables are designed to be strained at points intermediate of the length of the ladder, and to accomplish this end I provide the adjustable straining-bolts 50. Each bolt 50 is provided at one end of its threaded stem or shank with a saddle 51 for the cable, said saddle being preferably curved and flanged to afford a good broad surface for the bearing of the cable in the same and to keep the cable from displacement. The threaded stem of the bolt passes through a sleeve 52, which is made an integral part of or rigidly attached to a keeper 53, and on the stem of the bolt is arranged a rotary nut 54, that lies between the saddle 51 and one end of the sleeve 52, so as to bear against the latter and hold the adjusting-bolt in the desired position. The keepers 53 of the tension-bolts 50 are arranged to embrace the side rails of the ladder in a manner to move or be adjusted thereon without interfering with the rounds of the ladder, and thus the tension-bolts may be adjusted on the ladder to occupy different positions and be adjacent to the attaching device for the anchored braces.

In Figs. 10, 11, and 12 of the drawings I have shown different methods of connecting a round to a side rail of a ladder. The rounds are each made of a single piece of drawn seamless steel tubing for lightness and strength, and each round is constructed at its ends for secure attachment to the ladder-rails. The round shown at 55 has each end drawn flat and then split for a certain distance, after which the split ends are bent laterally to form right-angled flanges 56, that are applied against the inner face of the rail, so as to be fastened thereto in a suitable way— as, for instance, by a bolt, rivet, or screw. The round shown at 57 has its end drawn down to form a flat tenon, and against the faces of the ladder-rail are applied the slotted plates 58, arranged and fastened in place so as to have the slots therein in alinement with the slot in the rail, after which the drawn end of the round is passed through the slotted rail and plates, so as to protrude from the outside plate and have its ends bent or flanged against the same, thus making a strong connection between the round and the rail of the ladder. The round 60 has its flattened end fitted in a hole in the ladder-rail, and through said rail and the flattened end of the round is passed a pin or bolt 61, which lies at right angles to the round and which is arranged flush with the faces of the ladder-rail.

It is thought that the operation and the advantages of my invention will be readily understood from the foregoing description, taken in connection with the drawings.

I am aware that changes in the form and proportion of parts and in the details of construction of the devices herein shown and described as the preferred embodiment of my invention may be made by a skilled mechanic without departing from the spirit or sacrificing the advantages of my invention. I therefore reserve the right to make such modifications and alterations as fairly fall within the scope of the invention.

Having thus fully described my invention, what I claim as new, and desire to secure by Letters Patent, is—

1. The combination with a main carrying-axle, and a ladder thereon, of the cranked axle pivoted to the main axle and provided with a hanger-arm, a wheel journaled on the spindle of said cranked axle and provided with a perforated ring or annulus disposed adjacent to the hanger-arm, a locking-pin for holding the ring of the wheel in rigid relation to the hanger-arm of the cranked axle, and means for locking the cranked axle at different points of its adjustment on the main axle, as and for the purposes described.

2. The combination with a main carrying-axle, and a ladder thereon, of a cranked axle having means for locking it at different points of adjustment on said main axle, a wheel journaled on the spindle of the cranked axle and provided with perforations in its rim situated at suitable intervals and in alternate relation to the spokes, and an anchoring-rod which passes through the perforation in the rim of the wheel, as and for the purposes described.

3. The combination with a main carrying-axle, of the supporting-frame rigidly attached thereto and provided with a perforated segment, a ladder, a pivoted carrier in which the ladder is stepped, a block arranged between the ladder-rails and against the segment of the supporting-frame, the connected clips fitted to the block and the segment and embracing one of the rounds of the ladder, and a locking-pin engaging with the block and the segment of said supporting-frame, as and for the purposes described.

4. The combination with a wheeled main axle, and a ladder, of the inclined braces, a hinge-rod on which the braces are swiveled, and clip-bearings fitted to the ladder-rails and connected to one of the ladder-rounds, as and for the purposes described.

5. The combination with a ladder, of the clip-bearings fitted against the ladder-rails and provided with the elongated plates arranged to engage with adjacent rounds of the ladder, sleeves arranged between the clip-bearings, a hinge rod or bolt, and braces attached to the sleeves, as and for the purposes described.

6. The combination with a ladder, of the clip-bearings, sleeves fitted between the clip-bearings, a hinge rod or bolt passing through the clip-bearings and the sleeves, braces pivoted to the sleeves, and suitable anchoring devices for the braces, as and for the purposes described.

7. The combination with a wheeled axle, and a ladder, of the clip-bearings connected to the ladder, a hinge bolt or rod, carried by said clip-bearings, sleeves fitted to said rod to be confined between the clip-bearings, braces pivoted to the sleeves and provided with ground-plates, an anchoring-chain connecting the ground-plates, and other chains connecting the ground-plates to the axle, as and for the purposes described.

8. The combination with an axle, and a ladder, of braces having loose connections with the ladder, perforated ground-plates having pivoted connections with the braces, the hooks rigid with the ground-plates and the axle, anchoring-chains attached to said hooks of the ground-plates and the axle, and rods or stakes passing through the ground-plates to anchor them to the ground, as and for the purposes described.

9. The combination with a ladder and its truss, of the keepers which embrace the ladder-rails and are provided with the sleeves, the tension-bolts fitted in said sleeves and provided with the channeled saddles for the reception of the truss cables or rods, and nuts fitted on the bolts and bearing against the ends of the sleeves, as and for the purposes described.

In testimony whereof I affix my signature in presence of two witnesses.

HENRY HUBER.

Witnesses:
OLIVER L. CUNNINGHAM,
S. E. JENNER.